US007986235B2

(12) United States Patent
Posamentier

(10) Patent No.: US 7,986,235 B2
(45) Date of Patent: Jul. 26, 2011

(54) RFID RECEIVE-ONLY SYSTEM

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 11/726,979

(22) Filed: Mar. 23, 2007

(65) Prior Publication Data
US 2008/0231450 A1 Sep. 25, 2008

(51) Int. Cl.
*G08B 13/14* (2006.01)
(52) U.S. Cl. .......... 340/572.1; 340/10.1; 340/539.1; 340/572.2
(58) Field of Classification Search ........ 340/572.1, 340/825.49, 572.2, 10.1, 539.1; 235/385
See application file for complete search history.

(56) References Cited

U.S. PATENT DOCUMENTS

| | | | | |
|---|---|---|---|---|
| 5,119,104 A * | 6/1992 | Heller | ........................... | 342/450 |
| 5,920,261 A * | 7/1999 | Hughes et al. | ............. | 340/568.8 |
| 6,025,780 A * | 2/2000 | Bowers et al. | ............. | 340/572.3 |
| 6,084,513 A * | 7/2000 | Stoffer | ........................ | 340/572.2 |
| 6,404,339 B1 * | 6/2002 | Eberhardt | ................... | 340/572.1 |
| 6,411,213 B1 * | 6/2002 | Vega et al. | ................. | 340/573.3 |
| 6,621,894 B2 * | 9/2003 | Fujino et al. | ............. | 379/142.06 |
| 7,420,458 B1 * | 9/2008 | Kuzma et al. | ............. | 340/10.34 |
| 7,614,555 B2 * | 11/2009 | Sullivan et al. | ............... | 235/451 |
| 2005/0190060 A1* | 9/2005 | Clancy et al. | ............. | 340/572.9 |
| 2005/0212693 A1* | 9/2005 | Friedrich | ........................ | 342/42 |
| 2007/0046434 A1* | 3/2007 | Chakraborty | ................ | 340/10.1 |
| 2007/0097211 A1* | 5/2007 | Washington | .................. | 348/135 |
| 2007/0109124 A1* | 5/2007 | Park et al. | .................. | 340/572.1 |
| 2007/0139163 A1* | 6/2007 | Powell et al. | ................ | 340/10.2 |
| 2007/0229265 A1* | 10/2007 | Takeuchi et al. | ............. | 340/572.1 |
| 2008/0015728 A1* | 1/2008 | Kim et al. | ..................... | 700/121 |
| 2008/0129454 A1* | 6/2008 | Chen et al. | .................. | 340/10.1 |

* cited by examiner

*Primary Examiner* — Benjamin C Lee
*Assistant Examiner* — Quang Pham
(74) *Attorney, Agent, or Firm* — Schwegman, Lundberg & Woessner, P.A.

(57) ABSTRACT

A receive-only supplemental radio frequency identification (RFID) reader may receive response signals from RFID tags, digitize and interpret those signals, and transfer the resulting data to a primary RFID reader. By relieving the primary RFID reader of some or all of the tasks of receiving, demodulating, and decoding concurrent responses from multiple RFID tags, the primary RFID reader may be made less expensive and/or may devote its resources to other tasks.

12 Claims, 3 Drawing Sheets

RFID RECEIVE-ONLY SYSTEM

BACKGROUND

In some conventional radio frequency identification (RFID) systems (e.g., such as those used for inventory management or real-time location services (RTLS)), the RFID reader may need to transmit an enabling signal while simultaneously receiving and decoding numerous unsynchronized responses from numerous RFID tag devices at extremely low signal levels on the same frequency. As RFID applications become more demanding, the RFID reader may not be able to receive and decode many concurrent signals over the necessary range of signal strengths, while still performing the other tasks that are necessary in an RFID reader. Even when available technology makes such capability possible, the cost and complexity of an RFID reader with that capability may prevent it from being used in many applications.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
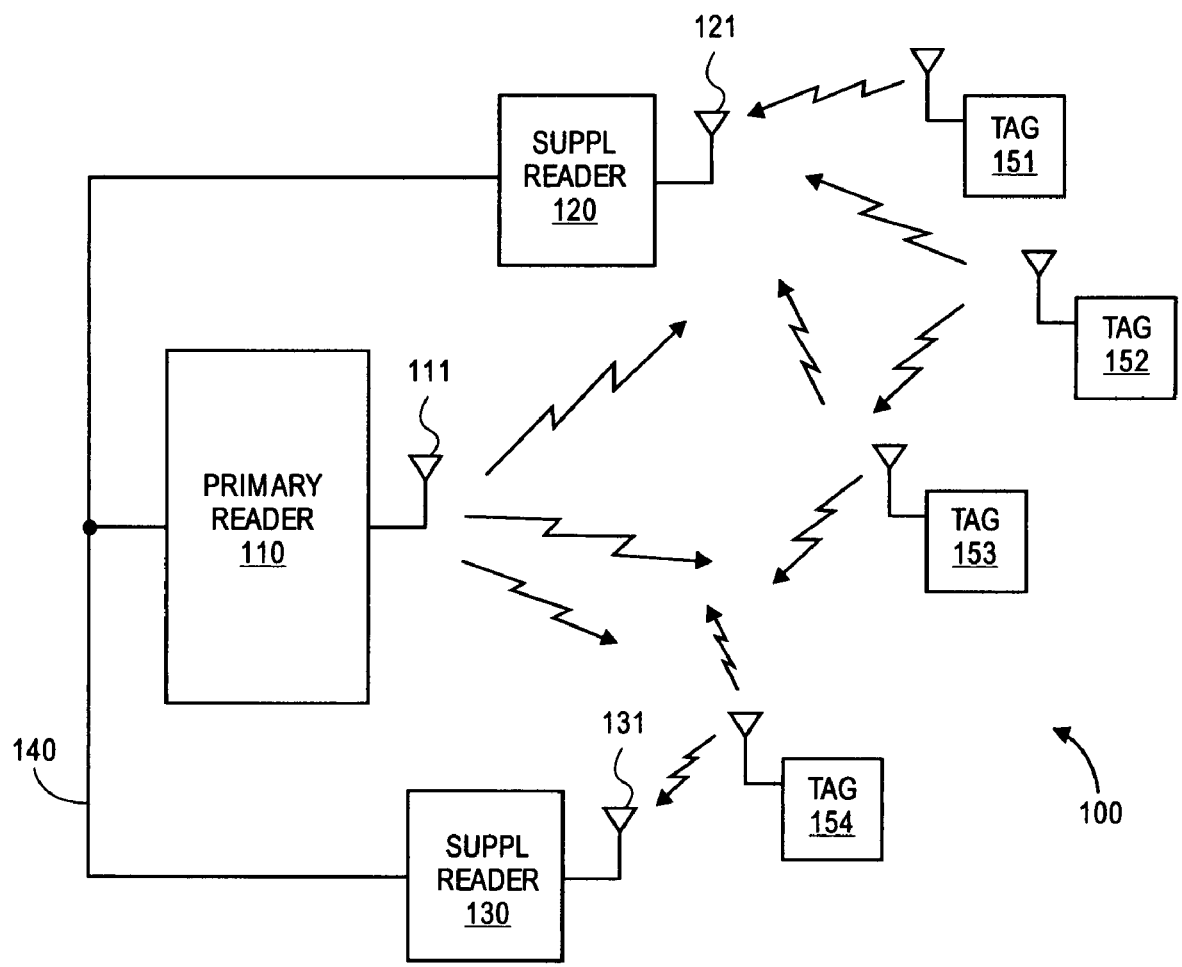
FIG. 1 shows a diagram of an RFID system, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" indicates that two or more elements are in direct physical or electrical contact with each other. "Coupled" indicates that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be physically in motion while it is communicating.

Within the context of this document, an RFID tag (sometimes referred to as an RFID transponder) is defined as comprising an RFID antenna (to receive an incoming wireless signal that serves to activate the RFID tag, and to transmit a wireless response in the form of a modulated radio frequency signal), and an RFID tag circuit (which may include circuitry to store an identification code for the RFID tag, circuitry to transmit that code through the antenna, and in some embodiments a power circuit to collect received energy from the incoming radio frequency signal and use some of that energy to power the operations of the RFID tag circuit). The RFID tag circuit and/or the RFID antenna may be in a standalone package, or may be incorporated in a package with other circuitry (e.g., on a printed circuit board or in a semiconductor die containing other circuitry). As is known in the field of RFID technology, "transmitting" a signal from an RFID tag may include either: 1) providing sufficient power to the antenna to generate a signal that radiates out from the antenna, or 2) reflecting a modulated version of the received carrier signal. Within the context of this document, an RFID reader is a device that wirelessly receives a signal from the RFID tag, after the RFID tag has been caused to wirelessly transmit the aforementioned response. In some embodiments an RFID reader may also transmit data and/or instructions to the RFID tag, which may affect the response from the RFID tag. A 'passive RFID tag' is an RFID tag that obtains its operating power by harvesting energy from the radio frequency signal received through its antenna, while an 'active RFID tag' is an RFID tag that obtains its operating power by being connected to a battery or other physically tangible power source (e.g., a power supply). Either type of tag may use the reflected, or backscattered, modulation method to communicate with the RFID reader.

Some embodiments of the invention may increase the potential performance of an RFID system by supplementing the primary RFID reader with one or more 'read-only' supplemental RFID readers that receive the responses of the RFID tags, as well as the transmissions of the primary RFID reader, and pass those responses on to the primary RFID reader. Since the read-only supplemental RFID readers do not need to transmit a signal (either modulated or un-modulated) to the RFID tags, the radio portion of those readers may be made much simpler. Further, the read-only RFID readers do not have to keep up with selection activities, controlling the responses, etc. Note: the term 'read-only', as used here, means that the supplemental RFID reader may not transmit wirelessly to the RFID tags. In some embodiments it may still transmit to other devices, either wirelessly or through a wired connection.

FIG. 1 shows a diagram of an RFID system, according to an embodiment of the invention. In the illustrated system 100, a primary RFID reader 110 may transmit an enabling signal through its antenna 111 to a number of RFID tags 151-154. Although only four tags are shown, in an actual implementation, dozens or even hundreds of tags may be close enough to the RFID reader to be energized by the enabling signal. Each RFID tag 151-154 may respond to the enabling signal by trying to transmit a response. In the case of passive RFID tags, this response may comprise of simply reflecting a modulated version of the signal received by each tag's antenna (e.g., by modulating the impedance of the antenna), but other embodiments may use other techniques. In some embodiments, the frequencies used in the RFID tag responses may be in the ultra-high frequency (UHF) band.

In a conventional system, primary reader 110 would be solely responsible for simultaneously transmitting the enabling signal and receiving the responses, and then decoding and separating the responses. In the illustrated embodiment, supplemental RFID readers 120 and 130 may receive the responses (through their respective antennas 121, 131), decode and separate the responses, but do not transmit to the RFID tags. Any feasible antenna types may be used, such as but not limited to dipole antennas, slot antennas, patch antennas, near field antennas, etc. Once the responses have been decoded and separated, those responses (or a modified version of them) may be communicated to the primary reader 110 from each supplemental reader. This communication may take any feasible form, such as but not including: 1) a wired communications path such as a shared local area network or a dedicated link, 2) a wireless link such as a radio communication using an antenna separate from the RFID antenna and using frequencies that won't interfere with the RFID communications.

In some embodiments the primary RFID reader may continue to receive, decode, and separate responses as it would in a conventional system, and the inputs from the supplemental readers may be used to add those responses that the primary reader was not able to pick up. In other embodiments, the primary reader may not be used to receive any of the responses, and the supplemental readers may be used to capture all responses. In still other embodiments, the primary reader may not be necessary, instead using a device to transmit an enabling signal and another device to collect the inputs from the supplemental readers. Two supplemental readers are shown, but other embodiments may have one, three, or more supplemental readers. In operations with multiple supplemental readers, many of the same responses may be received by more than one supplemental reader. In such cases, the primary reader, or other collection node, may compare the response information from the various supplemental readers and eliminate any duplicates. In other embodiments, supplemental information received about each response from multiple readers may be compared and used to determine other parameters.

Figure 2:
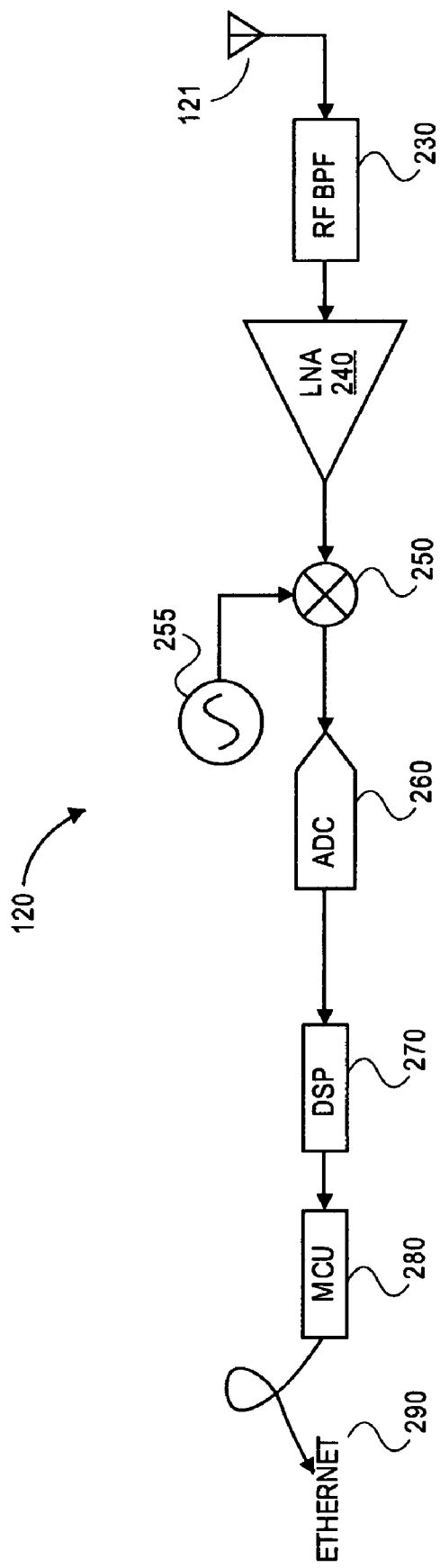
FIG. 2 shows a block diagram of a supplemental RFID reader, according to an embodiment of the invention.

FIG. 2 shows a block diagram of a supplemental RFID reader, according to an embodiment of the invention. Although the illustrated embodiment of supplemental RFID reader 120 shows a particular set of components, other embodiments may use a different set of components to produce the same results. In this example, antenna 121 may receive radio frequency (RF) wireless signals from the RFID tags, and filter the signals with an RF band-pass filter 230 to reduce the relative strength of any signals outside the frequency range of interest. Note: because multiple RFID tags may be responding to an enabling signal concurrently, the RF signals received through the antenna may contain concurrent wireless signals from multiple RFID tags. Low noise amplifier (LNA) 240 may then amplify the (possibly concurrent) signals of interest to improve the ability to process those signals. The output of the LNA 240 may be combined in mixer 250 with the output of an oscillator 255 to reproduce the signals that were originally modulated onto the RF carrier wave by the RFID tags and/or the primary RFID reader.

Analog-to-digital converter (ADC) 260 may convert the analog waveform being output from mixer 250 into a digitized representation of the waveform, so that the waveform may be processed by digital signal processor (DSP) 270. Such processing may be able to separate out transmissions from different sources, determine signal strengths from each of those different sources, and perform other waveform processing operations. The results may then go to a micro-controller unit (MCU) 280, where the results may be formatted for transmission to another device. This formatting may include adding descriptive information as needed. For example, the data from the MCU to the primary RFID reader may contain things such as, but not limited to: 1) identification of each RFID tag, 2) the signal strength of the signal received from each RFID tag, 3) the time of arrival of the response from each RFID tag, 4) the number of times each RFID tag has responded during the current read cycle (e.g., when repeated responses are received from the same tag, only a single identification of that tag may be transmitted from the supplemental reader to the primary reader, but information about the number of responses may be appended), 5) etc.

The illustrated embodiment shows a wired Ethernet connection being used for this transmission to another device, but other embodiments may use other types of communication, such as but not limited to: 1) a universal serial bus (USB), 2) a parallel bus, 3) a dedicated wired connection, 4) a wireless channel using a different antenna and different frequency band than are used for communications between the RFID tags and primary RFID reader, 5) etc.

It is important to note that the supplemental RFID reader 120 has no capability for, or circuitry to enable, an energizing signal to the RFID tags or direct transmissions to the RFID tags that those tags would recognize as a communication. However, in addition to receiving the responses from the RFID tags, in some embodiments the supplemental RFID reader 120 may also be able to receive and process the signal being transmitted from the primary RFID reader to the RFID tags. In particular, transmissions from the primary RFID reader that are being directed to a specific tag may be read and processed by the supplemental RFID reader. Although there would be little reason to transmit this information back to the primary RFID reader (it already knows what it transmitted), this information may be used to determine what type of response from the tag to expect, and might affect the formatting or content of the information transmitted to the primary RFID reader.

Figure 3:
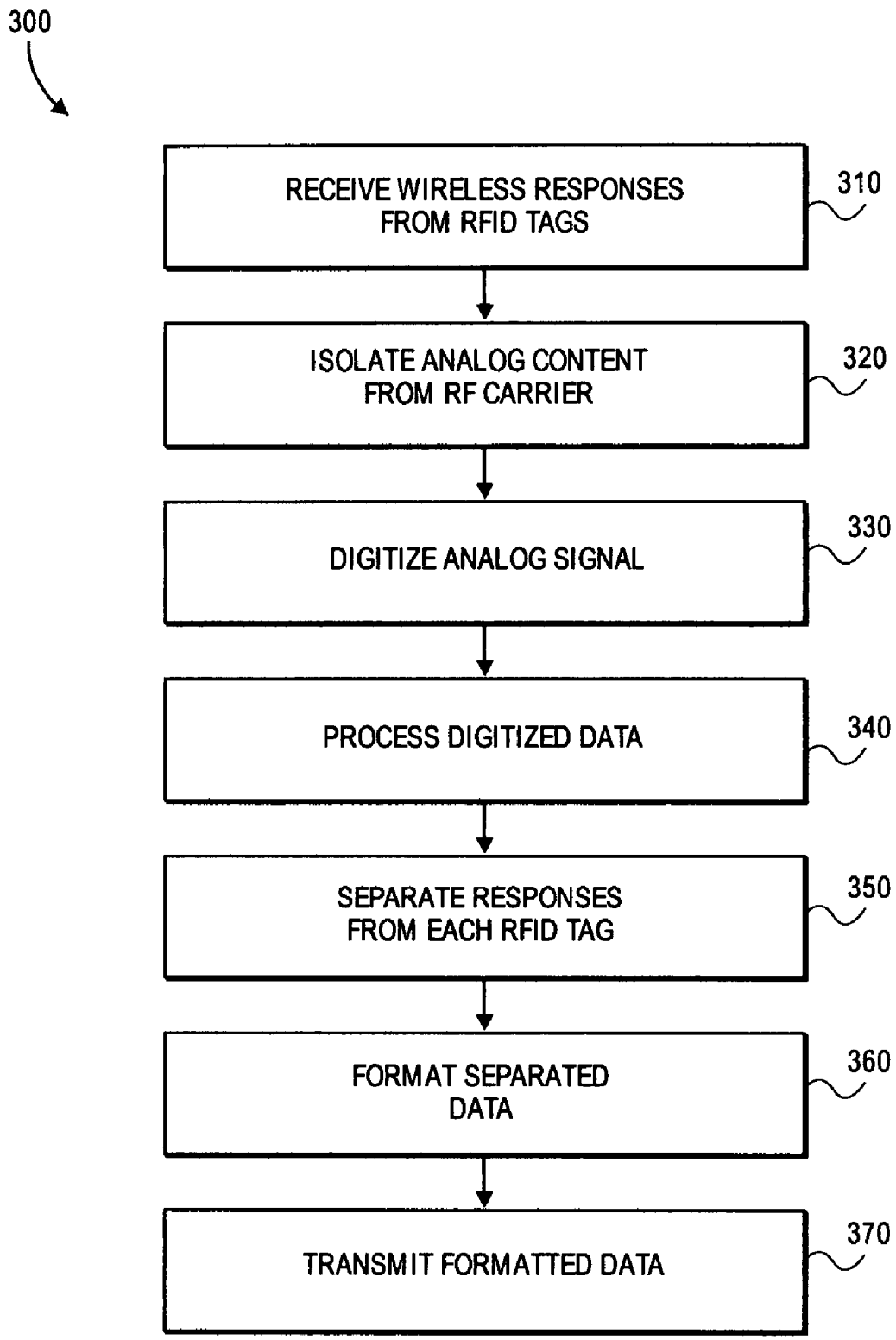
FIG. 3 shows a flow diagram of a method used by a supplemental RFID reader.

FIG. 3 shows a flow diagram of a method used by a supplemental RFID reader. In the illustrated flow chart 300, at 310 the supplemental RFID reader may receive wireless responses that would normally flow from RFID tags to an RFID reader. At 320, the RF component may be removed to isolate the analog component of the received signal, and this analog component may be digitized at 330. A digital signal processor may be used at 340 and 350 to process and separate the responses from the various RFID tags. The resulting data may be formatted at 360, and transmitted to the primary RFID reader at 370.

Note: although the previous descriptions have described transmitting the resulting information to the primary RFID reader, in some embodiments this information may be transmitted to another device, which may in turn provide the necessary information to the RFID reader. In still other embodiments, a primary RFID reader might not be used. An energizing RF carrier wave may be transmitted to activate the various RFID tags, and the processed responses from one or more supplemental RFID readers may go to a central processor for collection and further analysis. In a system of this type, the RFID tags might have no capability for taking direction, but instead simply respond to any energizing signal.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
a receive-only radio device to receive concurrent wireless signals from multiple radio frequency identification (RFID) tags and to receive a first wireless signal directed to a first RFID tag, the first wireless signal transmitted by a primary RFID reader, the radio device comprising:
a digital signal processor to convert the received wireless signals into digitized data representing contents of the wireless signals, wherein the digital signal processor is configured to process the first wireless signal and determine a type of response to expect from the first RFID tag based on the first wireless signal;
a counting module to count a number of times a particular RFID tag has responded in a read cycle; and
a communications interface to transmit digitized data received in a response from the particular RFID tag to the primary RFID reader only once in the read cycle when multiple responses are received from the particular RFID tag during the read cycle.

2. The apparatus of claim 1, wherein the communications interface comprises a wired interface.

3. The apparatus of claim 1, wherein said another device comprises an RFID reader with capability for concurrent wireless transmission and wireless reception.

4. The apparatus of claim 1, wherein the receive-only radio device is further to:
receive signals from an RFID reader addressed to at least one RFID tag; and
convert the received signals from the RFID reader into digitized data representing contents of the received signals from the RFID reader.

5. The apparatus of claim 1, wherein the wireless signals have a frequency in an ultra high frequency (UHF) band.

6. The apparatus of claim 1, further comprising a dipole antenna coupled to the communications interface.

7. The apparatus of claim 1, wherein the communications interface is further to transmit supplemental information about the digitized data.

8. The apparatus of claim 7, wherein the supplemental information includes at least one of:
identification of a particular RFID tag;
time of arrival of data from the particular RFID tag;
number of times the particular RFID tag has responded in current read cycle.

9. A method, comprising:
receiving a first wireless signal through an antenna of a read-only wireless communications device from a primary RFID reader, wherein the first wireless signal is directed to a first RFID tag;
processing the first wireless signal to determine a type of response to expect from the first RFID tag;
receiving wireless signals through the antenna of the read-only wireless communications device from multiple radio frequency identification (RFID) tags; converting the received signals into a digital format;
processing the digital signals to extract encoded data and separate the encoded data from separate RFID tags;
counting a number of times a particular RFID tag has responded in a read cycle; and
transmitting data received in a response from the particular RFID tag to the primary RFID reader through an interface other than the antenna, the transmitting occurring only once in the read cycle when multiple responses are received from the particular RFID tag during the read cycle.

10. The method of claim 9, wherein said transmitting is performed through a wired interface.

11. The method of claim 9, where said transmitting is performed through a wireless interface using a different frequency band than used by the received signals from the RFID tags.

12. The method of claim 9, further comprising:
receiving a signal from an RFID reader through the antenna; and
determining data content of the signal from the RFID reader.

* * * * *